United States Patent

Tomatsuri

[11] 3,912,137
[45] Oct. 14, 1975

[54] CAMERA CASE
[75] Inventor: Masakazu Tomatsuri, Tokyo, Japan
[73] Assignee: Nippon Kogaku K.K., Tokyo, Japan
[22] Filed: Dec. 21, 1973
[21] Appl. No.: 427,329

[30] Foreign Application Priority Data
Dec. 28, 1972 Japan.............................. 48-4775

[52] U.S. Cl................ 224/5 V; D87/5 E; 150/52 J
[51] Int. Cl.²........................................... A45F 5/00
[58] Field of Search............ 224/5 V, 5 H, 5 R, 5 A,
224/5 B; D87/1 R, 5 E; 150/52 J; 16/125,
114 R; 24/201 S, 201 BS, 208

[56] References Cited
UNITED STATES PATENTS
2,136,357  11/1938  Darling et al..................... 224/5 V X
2,223,219  11/1940  Mayerovitz...................... 224/5 V X
3,520,241   7/1970  Caldwell......................... 150/52 J X
D156,685  12/1949  Weiss........................... D87/5 E UX FOREIGN PATENTS OR APPLICATIONS
1,164,688  10/1958  France.............................. 150/52 J
1,366,974   6/1964  France.............................. 224/5 V Primary Examiner—Robert J. Spar
Assistant Examiner—Jerold M Forsberg
Attorney, Agent, or Firm—Fitzpatrick, Cella, Harper & Scinto

[57] ABSTRACT

A camera case suspended by a strap through suspension rings connected to pendants on a camera body includes two connector members provided so as to correspond to the pendants, respectively. Each of the connector members has one end secured to the camera case and the other end engageable with the camera case. The connector members may stride the pendants between the camera body and the suspension rings with the other end thereof engaged with the camera body, thereby uniting the camera body with the camera case.

3 Claims, 4 Drawing Figures

CAMERA CASE

BACKGROUND OF THE INVENTION

1. Field of the Invention

This invention relates to a camera case, and more particularly to improvements in a camera case which is suspended by a strap through suspension rings connected to pendants provided on the opposite sides of a camera body.

2. Description of the Prior Art

Most of the camera cases heretofore used have been provided with a tripod receiving thread formed at the bottom thereof and such tripod receiving thread has been used to unite the camera body with the camera case. Therefore, any of these camera cases had to be detached from the camera body each time a tripod was mounted directly to the camera body. To overcome such a disadvantage, the camera case itself is also provided with a tripod receiving thread so that a tripod may be connected to the camera body through such thread.

SUMMARY OF THE INVENTION

In view of the situation noted above, the present invention utilizes pendants for neck strap attached to the camera body to unite the camera body and its case together so as to enable a tripod to be directly secured to the camera body which is still united with its case.

According to the present invention, there is provided a camera case suspended by a strap through suspension rings connected to pendants provided on the opposite sides of a camera body, which camera case includes two connector members provided at the locations thereof corresponding to the two pendants, respectively. Each of the connector members has one end secured to the camera case and the other end engageable with the camera case. Thus, the connector members may be caused to stride the pendants between the camera body and the suspension rings and the other end of each connector member may be engaged with the camera body, thereby uniting the camera body and the camera case together.

The two connector members may be formed integrally with the camera case. Each of the connector members may take the form of a U-shaped band-like member which prevents occurrence of contact between the suspension rings and the camera body. The U-shaped band-like member may be formed integrally with the camera case. Each of the two connector members may preferably be formed of leather.

The invention will become more fully apparent from the following detailed description of an embodiment thereof taken in conjunction with the accompanying drawings.

DESCRIPTION OF THE PREFERRED EMBODIMENTS

Figure 1:
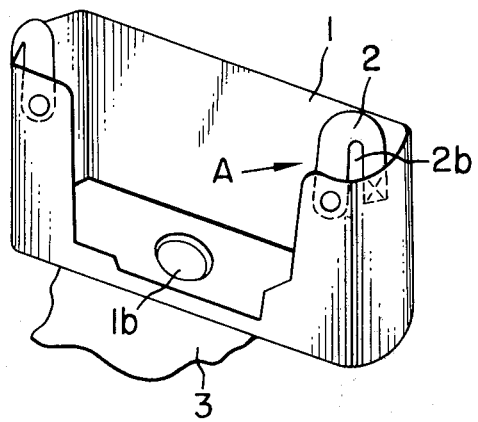
FIG. 1 is a perspective view of the camera case according to an embodiment of the present invention.
Figure 2:
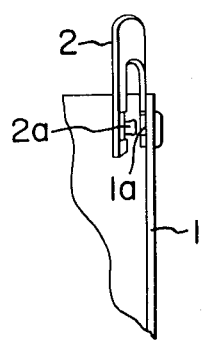
FIG. 2 is a detail of the connector member as viewed in the direction of arrow A in FIG. 1.
Figure 3:
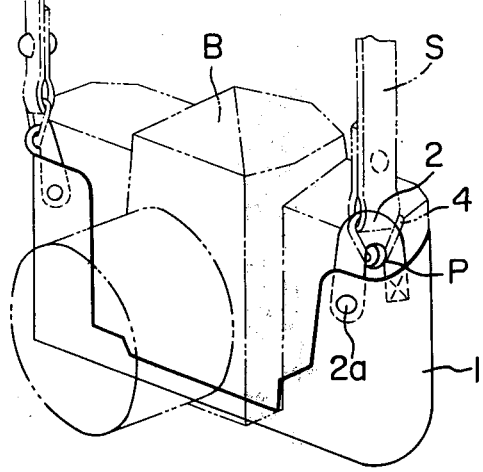
FIG. 3 illustrates the camera case of the present invention with a camera united therewith.

Referring to the drawings, a camera case body is designated by reference numeral 1 and has an access hole 1b formed at the bottom thereof for passing therethrough the screw portion of a tripod. A camera body B may be mounted in the camera case body 1 in the manner as shown in FIG. 3. As is usually the case, the camera body B on each side thereof has secured thereto a pendant P for mounting a suspension ring 4. A neck strap S has its opposite ends engaged with the suspension rings 4. A U-shaped connector member 2 has one end secured to the case body 1 and the other end provided with a fastener 2a which is engageable with a fastener 1a provided on the case body (see FIG. 2). The connector member 2 is designed such that the inner portion 2b thereof is engaged with the pendant P (see FIG. 3). It will be noted that two such connector members 2 are provided on the opposite sides of the case body 1, respectively. A case cover portion 3 is connected to the camera case body 1 and formed so as to cover the camera from the front to the top portion thereof, as is well known in the art.

Figure 4:
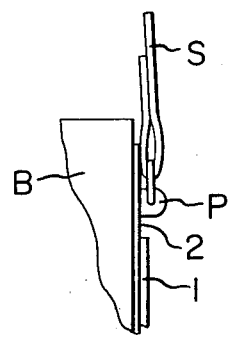
FIG. 4 illustrates the connector member in the position where the camera body and its case are united together.

With the described construction, the camera body B may be inserted into the case body 1, whereafter each of the connector members 2 may be inserted between the camera body B and the suspension ring 4 (see FIG. 4) and the fastener 2a may be engaged with the fastener 1a, whereby the camera body B may be united with the case body 1.

According to the present invention, as described above, the camera body can be simply mounted and dismounted with respect to the case body and the connector member also serves as a protective member between the suspension ring and the camera body, thereby protecting the camera body against any injuries or the like which would otherwise be imparted thereto. Moreover, the camera case need not be provided with a tripod receiving thread. In addition, the camera body as wrapped in the camera case permits a tripod to be connected thereto and this leads to an enhanced stability of picture-taking which means a great practical advantage.

In the illustrated embodiment, the connector member 2 has been shown as a U-shaped band-like member, whereas it may also be in the form of a string or cord. If formed of leather, the connector member 2 will especially be effective. Also, in the shown embodiment, one end 2a of the connector member 2 is fastened to the inner side of the camera case, but it may preferably be fastened to the outer side of the camera case when the case is formed of a harder material.

claim:

1. A case for a camera which is suspended by a strap (S) through suspension rings (4) connected to pendants (P) provided on the opposite sides of a camera body, the case comprising; two connector members (2) provided at locations on the camera case corresponding to said two pendants, respectively, each of said connector members having one end secured to said camera case and the other end releasably engageable with said camera case, whereby said connector members (2) may be caused to stride said pendants (P) between said camera body and said suspension rings (4) and said other end of each said connector member (2) may be engaged with said case, thereby uniting said camera body and said camera case together and protecting said camera body from abrasion by said suspension rings.

2. A camera case according to claim 1, wherein each of said two connector members (2) is a U-shaped band-like member which prevents occurrence of contact between said suspension rings and said camera body.

3. A camera case according to claim 2, wherein each of said two connector members (2) is formed of leather.

* * * * *